No. 887,327.

PATENTED MAY 12, 1908.

F. HERKERT, Jr.
TRUNK CASTER.
APPLICATION FILED OCT. 5, 1907.

Witnesses:
Geo. R. Ladson
Nells L. Church

Inventor,
Frederick Herkert, Jr.
By Bakewell & Cornwall Attys.

UNITED STATES PATENT OFFICE.

FREDERICK HERKERT, JR., OF ST. LOUIS, MISSOURI.

TRUNK-CASTER.

No. 887,327.  Specification of Letters Patent.  Patented May 12, 1908.

Application filed October 5, 1907. Serial No. 396,031.

*To all whom it may concern:*

Be it known that I, FREDERICK HERKERT, Jr., a citizen of the United States, residing at St. Louis, Missouri, have invented a certain new and useful Improvement in Trunk-Casters, of which the following is a full, clear, and exact description, such as will enable others skilled in the art to which it appertains to make and use the same, reference being had to the accompanying drawings, forming part of this specification, in which—

Figure 1:
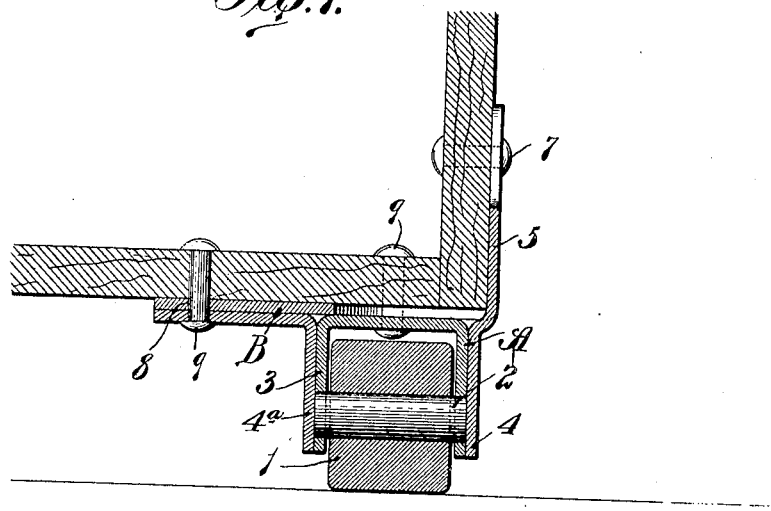
Figure 2:
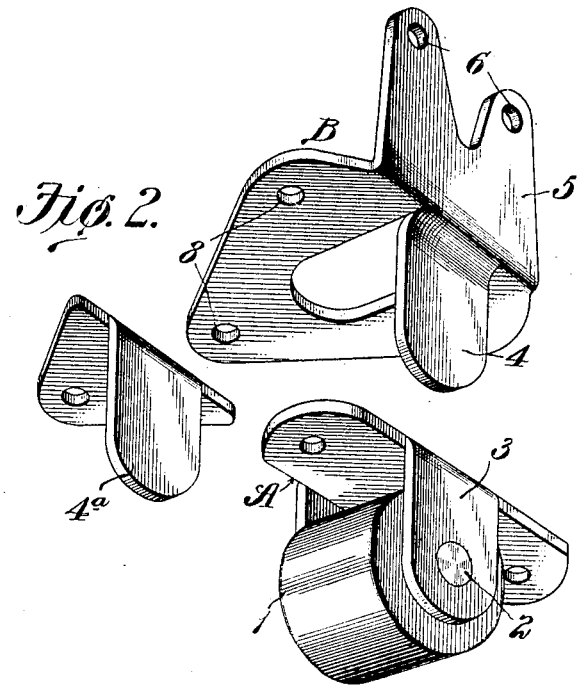

Figure 1 is a sectional view of a portion of a trunk showing my improved caster attached thereto, said caster also being in section; and Fig. 2 is a perspective view showing the members which form my caster, disassembled or detached from each other.

This invention relates to trunk casters, and has for its object to provide a trunk caster which is so constructed that the roller or wheel thereof cannot become jammed or accidentally detached from the bearing in which it is mounted. The trunk casters which have heretofore been in general use consisted of a bearing having a pair of wings or ears between which a roller or wheel was arranged, said roller being mounted on a horizontal pin that passed through said wings or ears and was riveted or upset at its ends to retain it in position. Casters of the description just referred to have not proved satisfactory for the reason that the pin on which the roller or wheel was mounted would pull out of the wings of the bearing and thus permit the roller to drop out of the bearing. The reason the roller pin would pull out easily was because it was secured in position merely by upsetting or riveting its ends and as the pin had to be formed of very hard material it was impossible to upset it sufficiently to provide a head that would prevent it from pulling out of the bearing when the wheel or roller was subjected to a heavy blow, as for example, when the trunk was thrown off a truck. An attempt was made to overcome this defect in the caster by using a pin of comparatively soft material so that it could be upset easily to provide a large head but the pin was so soft that it bent when the roller was subjected to excessive strain and thereby caused the roller to jam in its bearing.

As previously stated, the main object of my invention is to provide a caster in which the roller cannot become jammed or detached accidentally and to this end I have devised a caster in which the wheel or roller is mounted on a pin of hard material that passes through wings on the bearing and is retained in position by portions of the bearing that embrace said wings and extend over the ends of said pin.

Referring to the drawings which illustrate the preferred form of my invention, 1 designates the wheel or roller of the caster, and 2 the pin on which said roller is mounted. The bearing is preferably composed of several parts that can either be formed from cast metal or sheet metal bent to the proper shape. I prefer to form said members from hard sheet metal such, for example, as steel as I can stamp them out of a steel plate and bend them into proper shape at a low cost. The bearing comprises a member A provided with downwardly projecting ears or wings 3 through which the roller pin 2 passes and a member B provided with lugs 4 and $4^a$ that embrace the wings 2 of the member A so as to extend over the ends of the pin 2 and prevent it from pulling out or being displaced from the wings in which it is journaled, the member A being secured to the underneath side of the member B. The lugs 4 and $4^a$ of the member B not only prevent the pin 2 from being displaced but they also strengthen the ears 3 of the member A and prevent them from bending. I have herein shown the member B provided with one integral lug 4 and a lug $4^a$ formed by a separate piece of metal, but, if desired, both of the lugs 4 and $4^a$ could be formed integral with the member B without departing from the spirit of my invention.

An integral upstanding portion 5 on the member B is provided with openings 6 to receive rivets or other suitable fastening devices 7 that pass through the side of the trunk, and the portion of the member B that engages the bottom of the trunk is provided with openings 8 to receive rivets or fastening devices 9, said rivets also being utilized to secure the lug $4^a$ and the member A to the underneath side of the member B.

When attaching the caster to the trunk I prefer to first drive the rivets 7 which pass through the portion 5 of member B, then arrange the lug $4^a$ in position and drive the rivet which connects said lug to the member B, said rivet also passing through the bottom of the trunk, and thereafter arrange the member A between the lugs 4 and $4^a$ and drive the rivets which secure said member to the member B and also aid in securing the member B to the bottom of the trunk. The ends of the pin 2 are not upset or riveted over but extend perfectly flush with the outside faces of the wings 3 so that the pin can be formed from very hard material and as the lugs 4 and 4ª snugly embrace the wings 3 of the member A it will be impossible for the pin 2 to pull out of its bearings. It will, of course, be undertood that my improved caster is not limited in its use to trunks but could be used on other objects and while I have herein shown the member B as being provided with an upwardly projecting portion 5 that embraces the side of the trunk it will be obvious that this portion 5 could be omitted without departing from my invention.

Having thus described my invention, what I claim as new and desire to secure by Letters Patent is:

1. A caster comprising a member having ears that are provided with openings, a pin journaled in said openings and having a roller mounted thereon, and means separate and distinct from the member first referred to and embracing same to cover the ends of said pin to retain it in position; substantially as described.

2. A caster comprising a sheet metal attaching member provided with an integral downwardly projecting lug, a separate part secured to said member to form a second downwardly projecting lug, a sheet metal device secured to the underneath side of said attaching member and provided with integral wings that are arranged between the lugs thereon, a pin passing through openings in said wings and having its ends covered by the lugs on the attaching member, and a roller mounted on said pin; substantially as described.

3. A caster comprising a sheet metal member which rests against the bottom of a trunk or similar object and having an upwardly projecting portion that is secured to one side of the trunk, downwardly projecting lugs on said member, a part which contacts with the underneath side of said member, fastening devices passing through said part and member to secure them to the bottom of the trunk, ears on said part which are embraced by the lugs on said member, a pin of uniform cross section passing through openings in said ears and butting against the inside faces of the lugs on said member, and a wheel or roller mounted on said pin; substantially as described.

In testimony whereof I hereunto affix my signature in the presence of two witnesses, this second day of October 1907.

FREDERICK HERKERT, Jr.

Witnesses:
WELLS L. CHURCH,
GEORGE BAKEWELL.